United States Patent Office 2,908,207
Patented Oct. 13, 1959

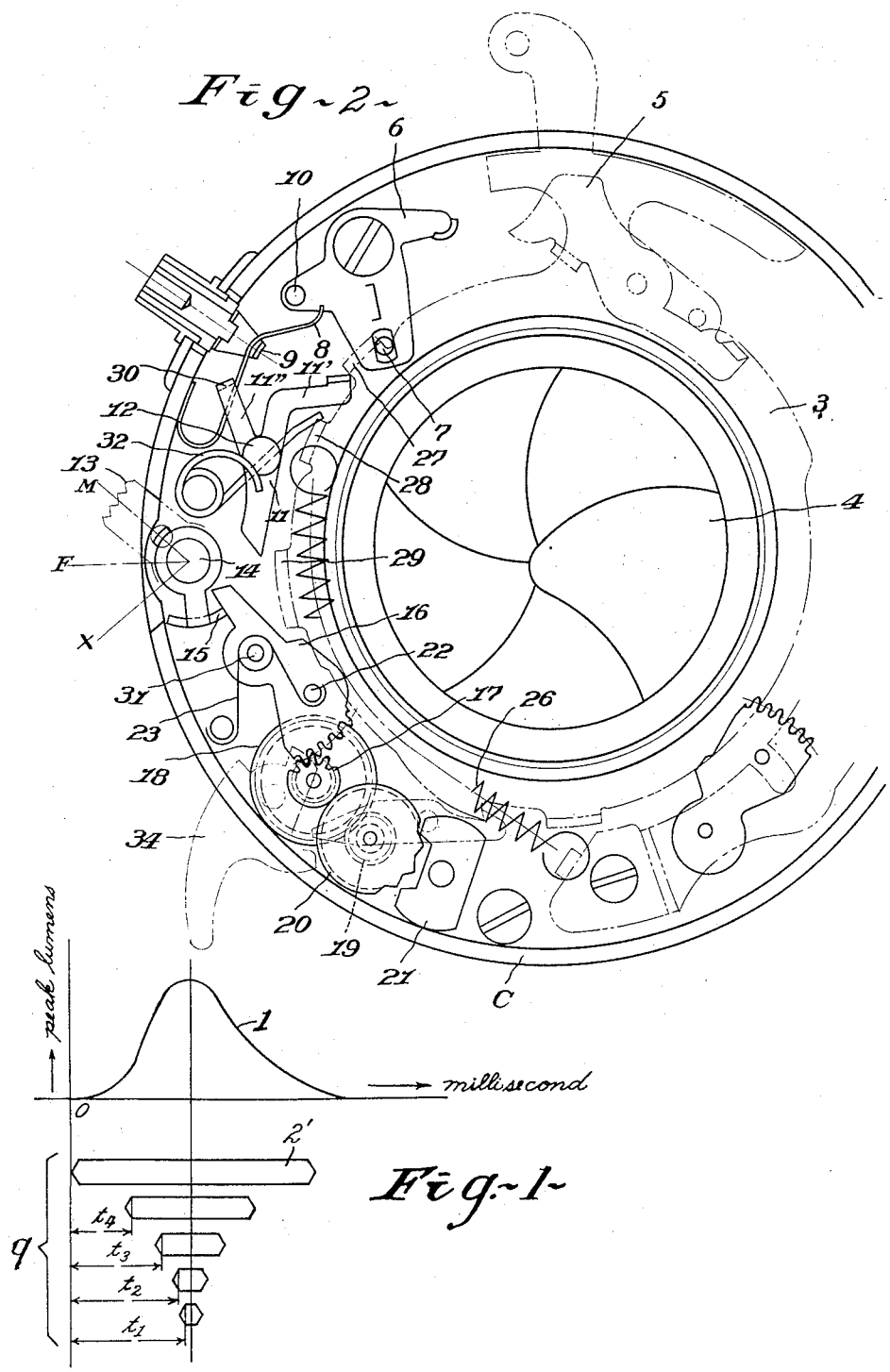

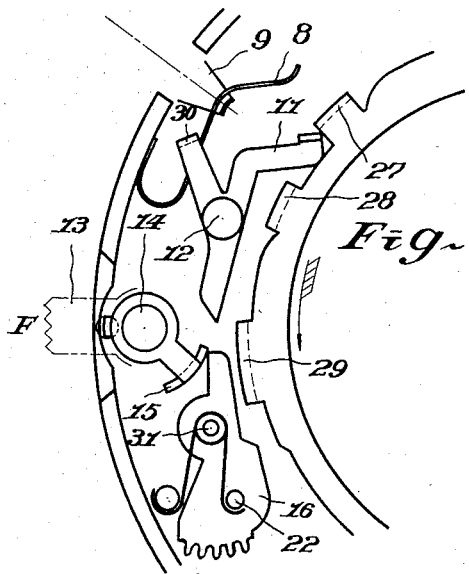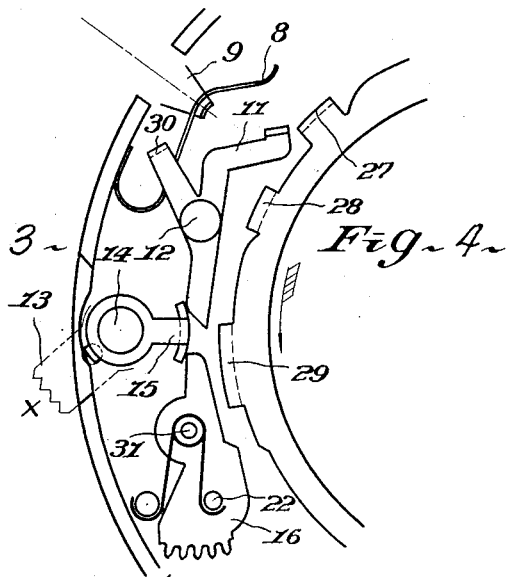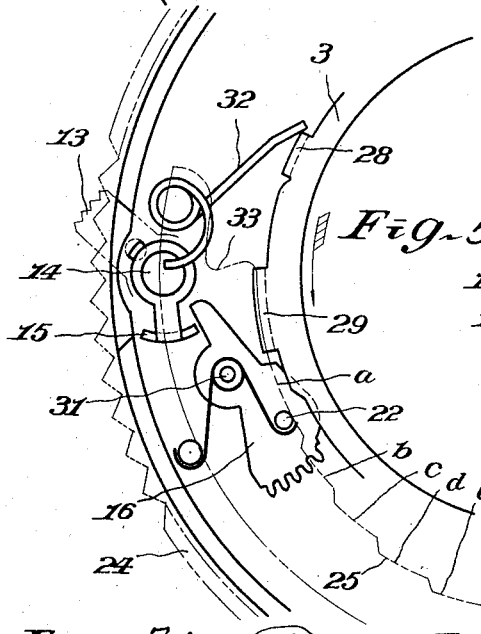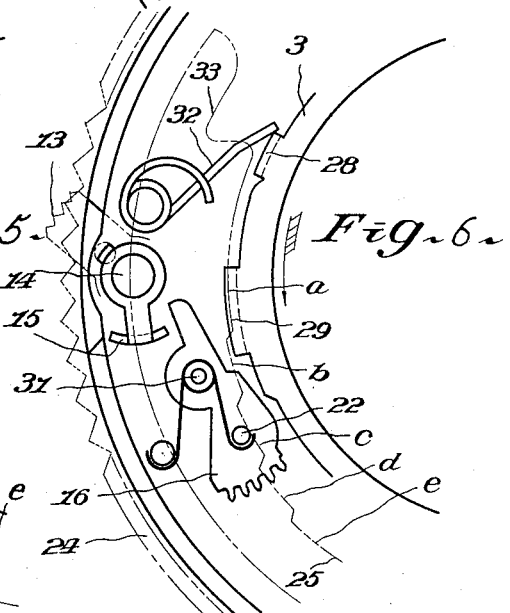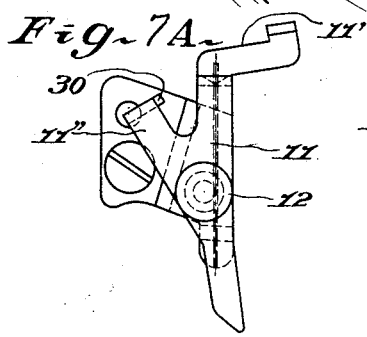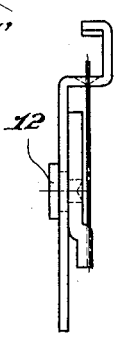

2,908,207

PHOTOGRAPHIC SHUTTER INCLUDING A FLASH-LIGHT SYNCHRONIZING MECHANISM

Takeo Sekine, Ichikawa-shi, Chiba-ken, Japan, assignor to Kabushiki-Kaisha Hattori Tokei-Ten, Tokyo-to, Japan Application August 28, 1956, Serial No. 606,625

3 Claims. (Cl. 95—11.5)

The present invention relates to a photographic shutter including a flash synchronizer built in said shutter and particularly to a photographic shutter of the type in which a gear retarding mechanism (hereafter, termed a synchrogovernor) which is resistively coupled with the main blade operating device, is used to control the speed of said device. The operating device being driven by a main driving spring so as to carry out opening and closing of the shutter blades.

A principal object of this invention is to provide a photographic shutter of the type in which the synchronizer is automatically adjusted by adjustment of the shutter speed control member to obtain the best possible light and speed combination for any type of photo-flash lamp to be used including repetitive and non-repetitive types.

Another object of this invention is to provide a photographic shutter of the type in which the stroke of a synchrogovernor thereof can be successively reduced to shorten the time-lag of the operation of shutter blades so as to obtain ideal synchronism between the flash light and a full open position of the shutter blades.

A feature of the shutter and synchronizer mechanism according to the invention is the provision of a shutter blade operating mechanism including an angularly displaceable operating lever for closing a normally open switch of a photoflash circuit to which a photoflash lamp is connected. Shutter release mechanism initiates the displacement of the lever. The operating lever closes the open switch and continues its movement to effectively open the shutter blades to a full open position. A synchrogovernor including gear-retarding mechanism retards the operating lever subsequent to closing the switch so that it effects maximum opening of the shutter at a time corresponding to the peak of maximum illumination of the photo flash lamp. The retardation takes place according to a desired accommodation for the characteristic time "lag" of the type photoflash lamp being used in the photoflash circuit.

A single speed control member cooperative with the synchrogovernor or synchronizer is provided. This control member is operable to a plurality of positions for selecting and varying the shutter speed and simultaneously varying and setting the retardation of the operating lever subsequent to closing the switch and prior to its effecting full opening of the shutter so that synchronization of peak illumination with maximum opening of the shutter is maintained regardless of the selected shutter speed setting. A single selector member operable to a plurality of positions corresponding to positions for determining the "lag" in accordance with the type of flash lamp employed cooperates with the retarding mechanism of the synchronizer so that the "lag" is easily provided for by setting the member. This selector member is moreover operable to a position in which it renders the retardation mechanism ineffective thereby to accommodate for repetitive flash-lamps having substantially no "lag."

The novel features of this invention are set forth with particularity in the appended claims. This invention itself, however, both as to its organization and its methods of operation, together with additional objects and advantages thereof and its comparison with conventional shutter mechanisms heretofore in use, will best be understood from the following description in connection with the accompanying drawings, in which:

Fig. 1 is a graph for showing the relations between a characteristic light curve of a flash lamp and various opening durations of the shutter blades according to the invention, Fig. 2 is an enlarged plan view of an example of the invention, in which the cover plate is removed and the parts which are unnecessary for illustrating the features of the invention are omitted, said view corresponding to a case in which the mechanism is set to accommodate a type M flash lamp, Fig. 3 is a fragmentary plan view of only the main parts of the example in Fig. 2 in which the mechanism is set to accommodate a type F flash lamp, Fig. 4 is a fragmentary plan view of only the main parts of the example in Fig. 2 in which the mechanism is set to accommodate to an electronic flash, Fig. 5 is a fragmentary plan view of only the main parts of the example in Fig. 2, in which the speed adjusting ring is set for an exposure time of $1/500$ sec., Fig. 6 is a fragmentary plan view of only the main parts of the example in Fig. 2, in which the speed adjusting ring is set for an exposure time of $1/100$ sec., Figs. 7A and 7B are, respectively, enlarged front and plan views of the contact lever which is used in the example of Fig. 2.

An actual embodiment of this invention will be described in connection with Figs. 2 through 7, in which the shutter mechanism comprises an annular casing C, a cover plate, not shown, surrounding a central exposure aperture, a main blade operating lever 3, shutter blades 4, a cam 5 carried by said lever 3, and a bell-crank 6 which cooperates with cam 5 and opens the blades 4 through a pin 7 fixed to the blade operating ring. The pin 7 engages in a hole of crank 6. In the circuit of a flash lamp, not shown, are inserted a stationary contact 9 and a flat-spring-shaped moving contact 8. These contacts form a switch adapted to close said circuit and are arranged so that the moving contact 8 may be brought in contact with the stationary contact 9 when the former contact is pushed downwardly by a pin 10 carried by the bell-crank 6.

A contact lever 11 having fork-shaped arms 11' and 11" (refer to Figs. 7A and 7B) is pivoted to the casing C at a pivotal shaft 12 and an exchange lever 13 having three positions corresponding to type M, F flash lamps and an electronic flash is provided. A shaft 14 of said lever 13 is provided with an arcuate cam 15. In the casing C is provided a synchrogovernor which consists of a first gear segment 16, a pinion 17 meshed with the teeth of segment 16, a gear wheel 18 fixed to the shaft of said pinion 19, a pinion 19 meshed with said gear wheel 18, an escape wheel 20 fixed to the shaft of said pinion 19 and an anchor 21 which engages with said escape wheel 20. A pin 22 carried by the first gear segment 16 is constantly pressed on the cam surface 25 of a shutter speed control ring 24 (refer to Figs. 5 and 6).

The main blade operating lever 3 is provided with a main driving spring 26 and with first, second and third projections 27, 28 and 29, respectively. When the lever 3 is rotated counterclockwise, the first projection 27 hits on the end of one arm 11' of the contact lever 11 so as to push said end down whereby the moving contact 8 is pushed down by the end 30 of the other arm 11" of lever 11, which results in closure of the contacts 8 and 9. On the other hand, the third projection 29 makes the first gear segment 16 of the synchrogovernor rotate clockwise around a pivotal shaft 31 thereof, whereby the gear members 17—21 are rotated so as to brake rotation of the main operating lever 3. In order to assist the main driving spring 26 in case a high exposure speed is needed an auxiliary spring 32 is provided. One end of spring 32 is engaged with the second projection 28 and another end of said spring 32 gives a counterclockwise torque to the main operating lever 3 in case said end is engaged with the cam surface 33 made on the shutter speed control ring 24. The release not shown is provided with a release lever 34.

Fig. 2 corresponds to the state, in which the main operating lever 3 is charged and the exchange lever 13 is set at the position accommodated to type M flash lamps.

When the lever 3 is released by the release lever 34, the main operating lever 3 rotates counterclockwise due to the force of the main driving spring 26, so that the contact lever 11 is rotated clockwise around the pivotal shaft 12 by means of the first projection 27 as described heretofore. Due to the rotation of the lever 11, the end 30 of said lever lowers and pushes the moving contact 8 downwardly so as to bring it in contact with the stationary contact 9, whereby a type M flash lamp is ignited. Next, the third projection 29 hits the first gear segment 16 of the synchrogovernor to rotate clockwise said gear segment around its pivotal shaft 31, whereby the synchrogovernor composed of the gear member 16—21 is started.

Accordingly, speed of rotation of the main operating lever 3 is reduced so as to obtain a time-lag corresponding to type M flash lamps. And then cam 5 pushes the bell-crank 6 so as to make said crank rotate counterclockwise, whereby the pin 7 is operated and opens the shutter blades 4. In this case, the contacts 8 and 9 are brought in contact again by the pin 10 due to counterclockwise rotation of the crank 6, but this second closing of the contacts 8 and 9 has no relation to the ignition of the flash lamp, because said contacts have been closed heretofore.

When the shutter mechanism is to be set for type F flash lamps it is only necessary to set the exchange lever 13 at the position F. In this case, the first gear segment 16 of the synchrogovernor is rotated clockwise by the cam 15, so that gear segment 16 is brought to a position outside of the path of movement of the third projection or lug 29 of the lever 3. Accordingly, when the shutter mechanism is set for type F flash lamps, the synchrogovernor stops at its idle position.

The various operations of the mechanism except the above mentioned operation relating to the cam 5 are the same with those in the case where the mechanism is set for type M flash lamps but in case of type F flash lamps the cam 5 hits the bell-crank 6 rapidly so that a desirable short time-lag can be obtained.

When the exchange lever 13 is set at X position, the first gear segment 16 of the synchrogovernor is set at its idle position and the contact lever 11 is rotated counterclockwise around the pivotal shaft 12 by the cam 15. Accordingly, the contact lever 11 is placed in a position outside the path of movement of the first projection 27 so that closing of the contacts 8 and 9 is not carried out by the contact lever 11. In this case, the contacts 8 and 9 are closed by the pin 10 of the bell-crank 6 upon full opening of the shutter blades by counterclockwise rotation of the bell-crank 6, whereby synchronizing accommodated to an electronic flash can be obtained.

According to this invention, as described above, the time-lag accommodated to type M or F flash lamps and electronic flash are, respectively, obtained by braking the main operating lever by means of a synchrogovernor, by displacing said synchrogovernor to its idle position, and by displacing both of said synchrogovernor and contact lever to their idle positions, whereby the time-lag accommodations can easily and accurately be carried out by merely positioning only one change-over lever.

Furthermore, according to this invention, the shutter speed control ring 24 is provided with the cam surfaces $(a)$, $(b)$, $(c)$, $(d)$ and $(e)$ (refer to Figs. 5 and 6) which are so formed that the operating angle of said first gear segment 16 can be reduced stepwise by pushing outward the pin 22 of the first gear segment 16 by said cam surfaces.

For example, the cam surfaces $(a)$, $(b)$, $(c)$, $(d)$ and $(e)$ can be formed so as to obtain the time-lags corresponding respectively, to exposure times of $\frac{1}{500}$ sec., $\frac{1}{250}$ sec., $\frac{1}{100}$ sec., $\frac{1}{50}$ sec., and $\frac{1}{25}$ sec. and more.

The pin 22 of the first gear segment 16 is always pressed against said cam surfaces by means of a spring 23. When the pin 22 is in contact with the cam surface $(e)$, the first gear segment 16 is not operated by the third projection 29.

According to the construction, when the shutter speed control ring 24 is adjusted to $\frac{1}{500}$ sec. for type M flash lamps the pin 22 is pressed on the cam surface $(a)$. On the other hand, the auxiliary spring 32 is engaged with the cam surface 33, so that when the release lever 34 is pushed, the main operating lever 3 is rotated counterclockwise with a high speed by the joint forces of the main and auxiliary springs 26 and 32. In this case, the synchrogovernor operates with maximum stroke so as to obtain a time-lag $t_1$, in Fig. 1, whereby maximum flash point of the flash lamp is brought in coincidence with the center position or maximum opening of the blades.

Next, when the speed control ring 24 is adjusted to $\frac{1}{250}$ sec., the pin 22 is brought in contact with the cam surface $(b)$ and stroke of the synchrogovernor is made shorter than the former case, so that a short time-lag $t_2$ (Fig. 1) is obtained, whereby the center position or maximum opening of the blades is synchronized with the maximum illumination of the flash lamp.

The same applies to each of the exposure times $\frac{1}{100}$ sec., $\frac{1}{50}$ sec., etc. When the mechanism is set to an exposure time longer than $\frac{1}{250}$ sec., the cam surface 33 is detached from the auxiliary spring 32 as shown in Fig. 6 and takes its idle position, so that said spring 32 does not relate to operation of the main operating lever 3, it being understood that in each shutter speed setting the time of maximum opening of the shutter blades corresponds with the peak of the illumination curve 1 according to Fig. 1.

According to this invention as described above, by provision of simple cam surfaces $(a)$, $(b)$, $(c)$, $(d)$ and $(e)$ on the shutter speed control ring 24, the stroke of the synchrogovernor, that is the operating angle of the first gear segment of the synchrogovernor, can be reduced automatically in proportion to the increase of the exposure time so as to obtain successively shortened time-lags whereby the ideal synchronism such as shown in Fig. 1-$q$ is obtained.

Furthermore, according to the mechanism of this invention, there is an advantage that the torque of the main operating lever can be increased by operation of the auxiliary spring in case of high speed exposures and this can be compensated by an increase of the operating angle of the first gear segment of the synchrogovernor, so that time-lag is always established as desired in any case, in which an auxiliary spring is used or is not used.

While I have shown and described certain specific embodiments of my invention, I am fully aware that many modifications thereof are possible. This invention, therefore, is not to be restricted within the description of the specification.

I claim:

1. In a photographic shutter the combination with shutter blades and a photo-flash circuit provided with a normally open switch, a shutter blade operating mechanism including a first angularly displaceable member, means for selectively displacing the first member at a given speed in a direction for closing said switch and subsequently operating the shutter blades, shutter release means for selectively initiating the displacement of said first member, a gear-retarding mechanism including a first gear rotationally driven by said first member for retarding the displacement of the first member subsequent to closing the switch thereby to selectively accommodate for the "lag" of the type photo-flash lamp to be used in said circuit and to synchronize the peak of maximum illumination of the photo-flash lamp with the maximum opening of the shutter blades, and a speed control member adapted to be selectively positioned to vary the speed of operation of the shutter blades and adapted to cooperate with said gear-retarding mechanism for angularly positioning said first gear whereby the first member is properly retarded regardless of the shutter operation speed determined by said speed control member.

2. In a photographic shutter the combination with shutter blades and a photo-flash circuit provided with a normally open switch, a shutter blade operating mechanism including a first angularly displaceable member movable in a predetermined path, means for selectively displacing the first member at a given speed in a direction for closing said switch and subsequently operating the shutter blades, shutter release means for selectively initiating the displacement of said first member, a gear-retarding mechanism including a first gear rotationally driven by said first member for retarding the displacement of the first member subsequent to closing the switch thereby to selectively accommodate for the "lag" of the type photo-flash lamp to be used in said circuit and to synchronize the peak of maximum illumination of the photo-flash lamp with the maximum opening of the shutter blades, a speed control member adapted to be selectively positioned to vary the speed of operation of the shutter blades and adapted to cooperate with said gear-retarding mechanism for angularly positioning said first gear whereby the first member is properly retarded regardless of the shutter operation speed determined by said speed control member, and a single member selectively positionable in a plurality of positions for angularly positioning said first gear with respect to the path of movement of said first member to determine said "lag" in cooperation with said first member and for selectively moving said first gear out of the path of said first member thereby to accommodate for repetitive flash-lamps having substantially no "lag."

3. In a photographic shutter the combination with shutter blades and a photoflash circuit provided with a normally open switch, a shutter blade operating mechanism including a first angularly displaceable member, means for selectively displacing said first member in a direction for closing said switch and subsequently operating the shutter blades to a full open position, means for selectively initiating the displacement of said first member, synchronizer means operated by said first member having means for adjustably retarding the displacement of the first member subsequent to closing the switch to accommodate for the "flag" of the type photoflash lamp to be used in said circuit and to synchronize the peak of maximum illumination of the photoflash lamp with the maximum opening of the shutter blades, and means to automatically synchronize the maximum opening of the shutter blades with the peak of maximum illumination of the type photoflash lamp being used in said circuit in accordance with any exposure time selected comprising a single shutter speed and exposure time control member cooperative with said synchronizer means and operable to a plurality of positions to select and vary the speed of operation of the shutter blades and to vary retardation of angular rotation of said first member subsequent to closing the switch and prior to operating the shutter blades to a full open position.

References Cited in the file of this patent

UNITED STATES PATENTS

| | | |
|---|---|---|
| 2,238,453 | Small | Apr. 15, 1941 |
| 2,596,671 | Fuerst | May 13, 1952 |
| 2,701,992 | Gorey | Feb. 15, 1955 |
| 2,710,568 | Braun | June 14, 1955 |
| 2,727,445 | Rentschler | Dec. 20, 1955 |

Notice of Adverse Decision in Interference

In Interference No. 91,613 involving Patent No. 2,908,207, T. Sekine, PHOTOGRAPHIC SHUTTER INCLUDING A FLASHLIGHT SYNCHRONIZING MECHANISM, final judgment adverse to the patentee was rendered June 22, 1965, as to claims 1 and 3.

[*Official Gazette September 28, 1965.*]